United States Patent
Huang et al.

(10) Patent No.: US 9,610,588 B2
(45) Date of Patent: Apr. 4, 2017

(54) ELECTRET NANOFIBROUS WEB AS AIR FILTRATION MEDIA

(71) Applicant: E I DU PONT DE NEMOURS AND COMPANY, Wilmington, DE (US)

(72) Inventors: Tao Huang, Downingtown, PA (US); Hyun Sung Lim, Midlothian, VA (US); Wai-Shing Yung, Chadds Ford, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 235 days.

(21) Appl. No.: 14/519,227

(22) Filed: Oct. 21, 2014

(65) Prior Publication Data

US 2015/0107457 A1    Apr. 23, 2015

Related U.S. Application Data

(60) Provisional application No. 61/893,316, filed on Oct. 21, 2013.

(51) Int. Cl.
*B03C 3/28* (2006.01)
*B01D 39/16* (2006.01)

(52) U.S. Cl.
CPC ............ *B03C 3/28* (2013.01); *B01D 39/1623* (2013.01); *B01D 2239/0435* (2013.01); *B01D 2239/10* (2013.01); *B01D 2239/125* (2013.01); *B01D 2239/1233* (2013.01)

(58) Field of Classification Search
CPC combination set(s) only.
See application file for complete search history.

(56) References Cited

U.S. PATENT DOCUMENTS

| | | | |
|---|---|---|---|
| 4,178,157 A | 12/1979 | van Turnhout et al. | |
| 4,588,537 A | 5/1986 | Klaase et al. | |
| 4,874,659 A | 10/1989 | Ando et al. | |
| 5,280,406 A | 1/1994 | Coufal et al. | |
| 6,183,670 B1 * | 2/2001 | Torobin ............ | B01D 39/1623 156/167 |
| 6,365,088 B1 | 4/2002 | Knight et al. | |
| 6,521,321 B2 | 2/2003 | Kahlbaugh et al. | |
| 6,969,484 B2 | 11/2005 | Horiguchi et al. | |
| 7,125,434 B2 | 10/2006 | Yavorsky et al. | |

(Continued)

FOREIGN PATENT DOCUMENTS

| | | | | |
|---|---|---|---|---|
| DE | WO 2010031490 A1 * | 3/2010 | ......... | B01D 39/1623 |
| WO | 03/080905 A1 | 10/2003 | | |

(Continued)

OTHER PUBLICATIONS

PCT Search Report and Written Opinion for International application No. PCT/US2014/061483 dated Feb. 19, 2015.

*Primary Examiner* — Duane Smith
*Assistant Examiner* — Sonji Turner

(57) ABSTRACT

The present invention is directed toward an improved air filtration medium comprising a single layer polymeric nanofibrous web comprising a single source randomly intermingled fiber network with electrostatic charge up to −20 kV, a filtration efficiency range from about 70% to about 99.99%, and an air resistance less than about 2.5 mm wg for 0.3 diameter micron particles. The air filtration medium is made from a centrifugal melt spinning process.

7 Claims, 3 Drawing Sheets

(56) References Cited

U.S. PATENT DOCUMENTS

| | | | |
|---|---|---|---|
| 8,277,711 B2 * | 10/2012 | Huang | D01D 5/0023 264/211.1 |
| 8,282,712 B2 | 10/2012 | Chi et al. | |
| 2006/0137317 A1 | 6/2006 | Bryner et al. | |
| 2008/0023888 A1 * | 1/2008 | Brang | D01D 5/0985 264/555 |
| 2008/0242171 A1 * | 10/2008 | Huang | D01D 5/0023 442/51 |
| 2009/0160099 A1 * | 6/2009 | Huang | B82Y 30/00 264/465 |
| 2010/0043639 A1 * | 2/2010 | Fox | B32B 5/26 96/74 |
| 2010/0129628 A1 | 5/2010 | Young | |
| 2014/0120322 A1 * | 5/2014 | Fu | D04H 1/4242 428/176 |

FOREIGN PATENT DOCUMENTS

| | | | | |
|---|---|---|---|---|
| WO | 2013/096672 A1 | 6/2013 | | |
| WO | WO 2013096672 A1 * | 6/2013 | | D04H 1/732 |

* cited by examiner

ELECTRET NANOFIBROUS WEB AS AIR FILTRATION MEDIA

This application claims the benefit of priority of U.S. Provisional Application No. 61/893,316 filed Oct. 21, 2013, which is incorporated herein by reference in it's entirety.

FIELD OF THE INVENTION

This invention relates to an electret nanofibrous web comprising a single source randomly intermingled fiber network with a range of fiber diameters that yield improved filtration properties especially for use in air filtration.

BACKGROUND

The increased surface to volume ratio afforded by nanofibers has significant influences on a broad range of applications. In particular, in filter performance, which is based on producing the highest flow rate while trapping and retaining the finest particles without blocking the filter, nanofibers have improved interception and inertial impaction efficiencies.

In practice, the nanofiber medium on itself is soft and fragile and cannot be used alone as air filters. Nanofibers currently can only be coated on a rigid substrate to form a composite that can be handled readily. Most often the substrate is a non-woven microfiber medium. Nanofiber coating can be either produced by electrospinning method or melt-blown process, with diameter of electrospun fibers usually smaller than that of melt-blown fibers. Electrospun nanofibers are typically produced at such low rates as to be excessive in cost for many applications, and melt blown nanofibers are relatively expensive when compared to standard filter media. Even islands-in-the-sea nanofibers, which can be produced at high rates, are costly to produce because they require a removable sea and a process step to remove the sea. Melt blown nanofiber processes or melt film fibrillation process that randomly lay down fibers do not provide adequate uniformity at sufficiently high throughputs for most end use applications.

Nonwoven webs have been disclosed for use in air filtration media. U.S. Patent Application 2006/0137317 and U.S. Pat. No. 8,282,712 disclose a filtration medium consisting of a 2-layer scrim-nanofiber (SN) structure for air filters. The SN structure has at least one nanofiber layer of fibers having diameters less than 1 μm and at least one upstream scrim layer. The medium has sufficient holding capacity for dust particles that efficiency loss and pressure loss across the medium are minimized during use. The medium has good flux/barrier properties (i.e., high efficiency and low pressure drop). However, the dust-loading capacity is lower than the desired value in certain industrial HVAC applications when filters are challenged with very small dust particles, which can occur when the HVAC system is designed and constructed to have lower efficiency pre-filters in front of the high-efficiency final filters. In the SN structure, the scrim is typically made of nonwoven webs of fibers with fiber diameters of 14 to 30 microns which can pre-filter out particles larger than about 5 microns in size. The remaining particles will reach the thin nanofiber layer and quickly fill up the pores and plug up the filters. As a result, filter resistance increases rapidly and thus shortens filter life. Attempts have been made to increase the dust-loading capacity by increasing the basis weight and thickness of the scrim layer.

U.S. Pat. No. 6,521,321 discloses attempts to increase life-time of air filters by layering at least 6 to 7 coarse and fine fiber webs alternatively in a gradient-structure media (e.g., SNSNSN). The number of layering required makes this approach economically unattractive.

U.S. Pat. No. 7,125,434 discloses attempts to use a deep gradient-density filter consisting of three zones of materials for filtering biopharmaceutical fluids. The filter has a depth of at least 1.27 cm and is designed for liquid filtration. The thickness is prohibitive for pleated air filtration uses.

On the other hand, electrically-charged nonwoven webs are commonly used as filters in respirators to protect the wearer from inhaling airborne contaminants. The electric charge enhances the ability of the nonwoven web to capture particles that are suspended in a fluid. The nonwoven web captures the particles as the fluid passes through the web. Electrically-charged dielectric articles are often referred to as "electrets", and a variety of techniques have been developed over the years for producing these products. Electrostatically treated meltblown filter media, as described in U.S. Pat. Nos. 4,874,659 and 4,178,157, perform well initially, but quickly lose filtration efficiency in use due to dust loading as the media begin to capture particles and the electrostatic charge thus becomes insulated. In addition, as the effective capture of particulates is based on the electrical charge, the performance of such filters is greatly influenced by air humidity, causing charge dissipation. Fibrous electret webs have been produced by electrizing the fibers or the fiber webs, deliberately post-charging them with a corona discharge device (U.S. Pat. Nos. 4,588,537, 6,365,088 and 6,969,484), tribocharging which occurs when high-velocity uncharged jets of gases or liquids are passed over the surface of a dielectric film (U.S. Pat. No. 5,280,406) or adding certain additives to the web to improve the performance of electrets.

U.S. Pat. No. 8,277,711 disclosed a nozzle-less centrifugal melt spin process. The resulting nanofibers were laid on a belt collector to form web media using the process of WO 2013/096672. This technology makes it possible for mass production of nanofibrous web with much higher throughput and much lower manufacturing cost.

What is needed is an improved electret nanofibrous web with higher air filtration efficiency and lower air resistance.

SUMMARY

The present invention is directed toward an air filtration media comprising a single layer polymeric electret nanofibrous web comprising a single source randomly intermingled fiber network having an electrostatic charge up to −20 kV, a filtration efficiency range from about 70% to about 99.99% and an air resistance less than about 2.5 mm wg for 0.3 micron diameter particles.

The present invention is further directed toward an air filtration media comprising a nanofibrous web comprising: (a) at least about 65% by number of fibers in the nanofibrous web are nanofibers with a number average diameter less than about 1000 nm; (b) at most about 30% by number of fibers in the nanofibrous web are microfibers with a number average diameter from about 1.0 μm to about 3.0 μm; and (c) at most about 5% by number of fibers in the nanofibrous web are coarse fibers with a number average diameter greater than about 3.0 μm.

The present invention is still further directed toward an air filtration media comprising a nanofibrous web made by a centrifugal melt spinning process.

DETAILED DESCRIPTION

Definitions

Figure 1:
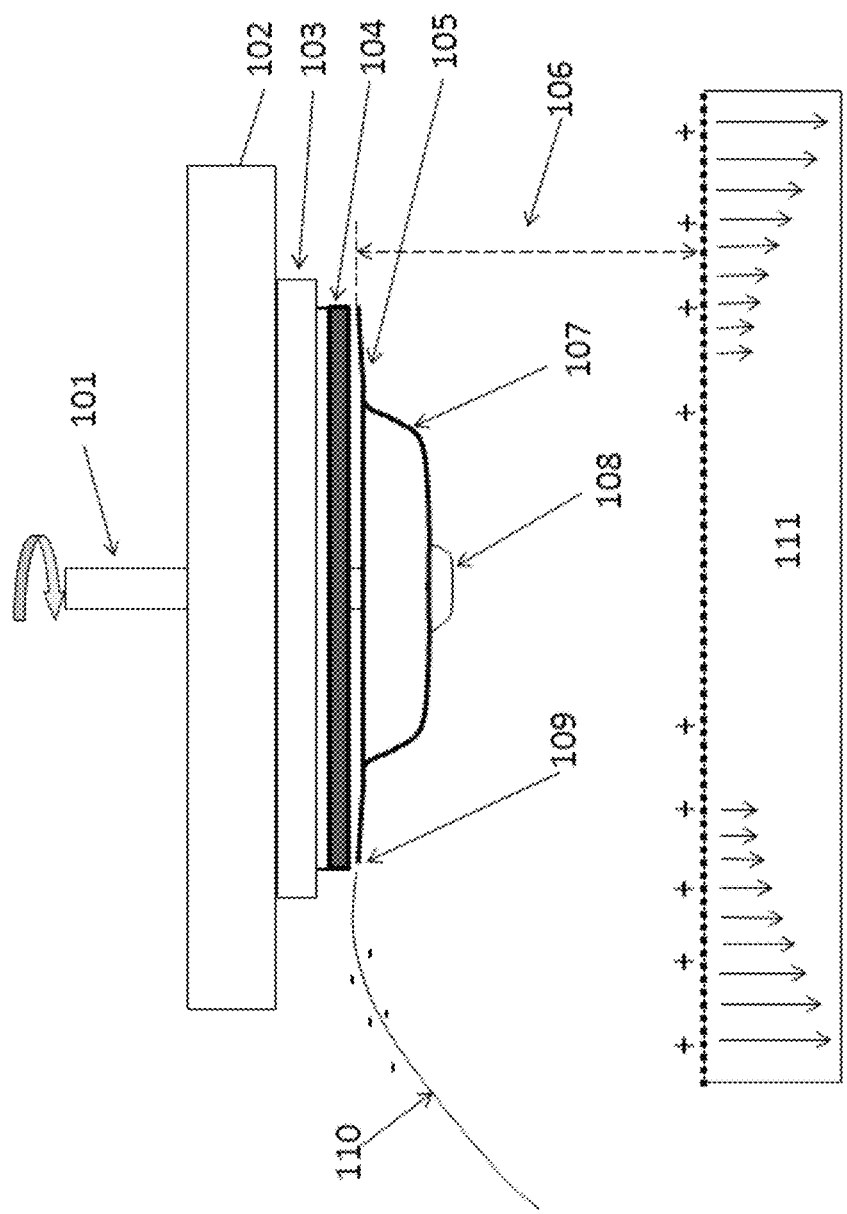
FIG. 1 is a view of a centrifugal melt spinning apparatus using a spin disk suitable for use in producing a nanofibrous web according to the present invention.
Figure 2:
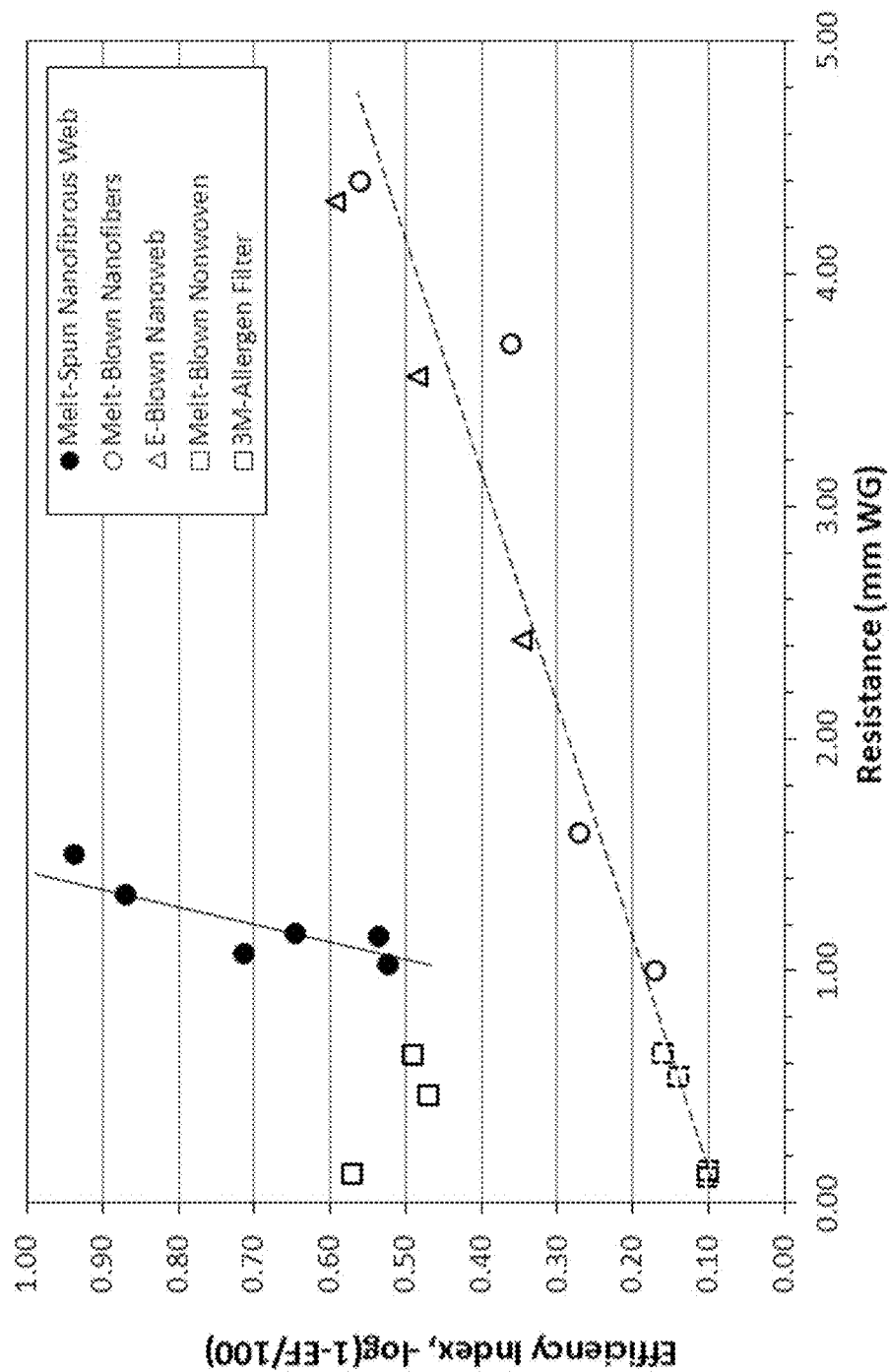
FIG. 2 is the efficiency index of air filtration media as a function of air resistance for Examples of the present invention as compared with variously spun nonwovens of the Comparative Examples.

The term "web" as used herein refers to layer of a network of fibers commonly made into a nonwoven.

The term "nonwoven" as used herein refers to a web of a multitude of essentially randomly oriented fibers where no overall repeating structure can be discerned by the naked eye in the arrangement of fibers. The fibers can be bonded to each other, or can be unbounded and entangled to impart strength and integrity to the web. The fibers can be staple fibers or continuous fibers, and can comprise a single material or a multitude of materials, either as a combination of different fibers or as a combination of similar fibers each comprising of different materials.

The term "nanofibrous web" as used herein refers to a web constructed predominantly of nanofibers. "Predominantly" means that greater than 50% of the fibers in the web are nanofibers.

The term "nanofibers" as used herein refers to fibers having a number average diameter less than 1000 nm. In the case of non-round cross-sectional nanofibers, the term "diameter" as used herein refers to the greatest cross-sectional dimension.

The term "microfibers" as used herein refers to fibers having a number average diameter from about 1.0 µm to about 3.0 µm The term "coarse fibers" as used herein refers to fibers having a number average diameter greater than about 3.0 µm.

By "electrets" is meant electrically-charged dielectric articles.

By "stand-alone" is meant the nanofibrous web is single layer, self-contained and without any substrate.

By "single source" is meant any structural properties and electrically-charged property of the web come from a single spinning process.

By "centrifugal spinning process" is meant any process in which fibers are formed by ejection from a rotating member.

By "rotating member" is meant a spinning device that propels or distributes a material from which fibrils or fibers are formed by centrifugal force, whether or not another means such as air is used to aid in such propulsion.

By "concave" is meant that the inner surface of the rotating member can be curved in cross-section, such as hemispherical, have the cross-section of an ellipse, a hyperbola, a parabola or can be frustoconical, or the like.

By "spin disk" is meant that a rotating member has a disk shape with a concave, frustoconical or flat open inner surface.

By "spin bowl" is meant that a rotating member has a bowl shape with a concave or frustoconical open inner surface.

By "fibril" is meant the elongated structure that may be formed as a precursor to fine fibers that form when the fibrils are attenuated. Fibrils are formed at a discharge point of the rotating member. The discharge point may be an edge, serrations or an orifice through which fluid is extruded to form fibers.

By "nozzle-free" is meant the fibril or fibers that are not from a nozzle-type spinning orifices, or there are no any nozzles on rotating member.

By "air flow field" is meant the vector field that describes the air speed and direction at any point or physical location in the process of the invention.

By "charged" is meant that an object in the process has a net electric charge, positive or negative polarity, relative to uncharged objects or those objects with no net electric charge.

By "spinning fluid" is meant a thermoplastic polymer in either melt or solution form that is able to flow and be formed into fibers.

By "discharge point" is meant the location on a spinning member from which fibrils or fibers are ejected. The discharge point may, for example, be an edge, or an orifice through which fibrils are extruded.

By "essentially" is meant that if a parameter is held "essentially" at a certain value, then changes in the numerical value that describes the parameter away from that value that do not affect the functioning of the invention are to be considered within the scope of the description of the parameter.

The present invention is directed toward a filtration media comprising a single layer polymeric nonwoven web, wherein the nonwoven web comprises a single source randomly intermingled fiber network. The network comprises at least about 65% by number of fibers in the nonwoven web of nanofibers with an average fiber diameter less than about 1000 nm, at most about 30% by number of fibers in the nonwoven web of microfibers with an average fiber diameter from about 1.0 µm to about 3.0 µm, and at most about 5% by number of fibers in the nonwoven web of coarse fibers with an average fiber diameter greater than about 3.0 µm, and wherein the average fiber diameter of the nonwoven web is less than 1.0 µm. The nonwoven web can be made using the centrifugal melt spinning process as disclosed in U.S. Pat. No. 8,277,711, which is hereby incorporated by reference, with changes as described in the Examples.

Nonwoven web can be made using the centrifugal melt spinning process as disclosed in U.S. Pat. No. 8,277,711. The nanofiber formation is through uniform thin film fibrillation. The melt flow spread on the inner surface of the spin disk to form a thin film. The film fibrillation occurs at the edge of spinning disk and forms thin threads. These thin threads are further stretched into fibers by centrifugal force. For a given polymer, nanofibers are formed from a uniform stable thin film fibrillation in U.S. Pat. No. 8,277,711. The operation parameters of fiber spinning are temperatures, melt feeding rate and disk rotating speed. In the present invention, the incorporated with changes of operation by changing the operation regime of temperatures, melt feeding rate and disk rotating speed in order to create the filming instability, the relative thicker film moves outward with radial banding from the center to the edge, and the film appears wavy in thickness. The nanofibers are formed from the thinner region of thin film, the coarse fibers are from the thicker region of the thin film, and the microfibers are from the film region in between. This process utilizes a spinning disk or bowl that generates fibers with a range of fiber diameters.

The present invention relates to the incorporation of changes of operation on temperatures, melt feeding rate and disk rotating speed to create the filming instability and the relative thicker wavy film.

For a given polymer comparing with U.S. Pat. No. 8,277,711, the present invention has lower temperature of the inner surface of spin disk or spin bowl, melt extrusion and melt transfer line temperature, as well as the stretching zone temperature as described in the Examples. For example, the pure nanofiber web was made according to U.S. Pat. No. 8,277,711, where the temperature of inner surface of spin disk or spin bowl is 260° C., melt extrusion and melt transfer line temperature are 200° C., as well as the stretching zone temperature is 150° C. The nanofibrous web comprising of nanofibers, microfibers and coarse fibers in examples is made according to the present invention, where the temperature of inner surface of spin disk or spin bowl is 200° C., melt extrusion and melt transfer line temperature are 200° C., as well as the stretching zone temperature is 100° C.

For a given polymer comparing with U.S. Pat. No. 8,277,711, the present invention is about lowering the rotating speed of spin disk or spin bowl as described in the Examples. For example, the pure nanofiber web made according to U.S. Pat. No. 8,277,711, where the rotating speed is 14,000 rpm. The nanofibrous web comprising nanofibers, microfibers and coarse fibers in example 1 is made according to the present invention, where the rotating speed is 10,000 rpm.

For a given polymer comparing with U.S. Pat. No. 8,277,711, the present invention is about to increasing the melt feeding rate to the spin disk. For example, the pure nanofiber web was made according to U.S. Pat. No. 8,277,711, where the melt feeding rate is 8 gram/min. The nanofibrous web comprising of nanofibers, microfibers and coarse fibers in example 1 is made according to the present invention, where the melt feeding rate is 10 gram/min.

The present invention is also about applying controlled pulse feeding. The present invention is also about applying controlled pulse rotating speed.

The fibers were laid on a belt collector to form PP web media using the process of WO 2013/096672, which is hereby incorporated by reference. The web laydown of fibers is controlled by a combination of the designed air flow field and a charging arrangement. The operation parameters of air flow field are the air temperatures and air flow rates of the stretching zone air, shaping air and a center air applied through the hollow rotating shaft and an anti-swirling hub. There is dual high voltage charging on the collector belt and an on the corona ring around the spinning disk. The finished product of nonwoven web has maintained an electrostatic charge. The resulting nonwoven web has the enhanced mechanical properties compared with the pure nanofiber web.

This process utilizes a spinning disk that generates fibers with a range of fiber diameters. This nonwoven web has a porosity of at least about 65%, a mean flow pore size of at most about 15 μm, and a Frazier air permeability from about 870 cm$^3$/cm$^2$/min to about 6000 cm$^3$/cm$^2$/min at 125 Pa. The nonwoven web has a basis weight of between about 5 to about 100 g/m$^2$ and preferably between about 20 g/m$^2$ to about 60 g/m$^2$.

Any fiber forming melt spinnable polymer can be used. For example, polyolefins can be used, particularly polypropylene and blends.

The nonwoven web has an electrostatic charge.

Methods of Spinning

Considering first FIG. 1 for spin disk, fibers 110 are shown exiting a discharge point 109 at the edge of spin disk. The fibers are deposited on a collector 111. Typically, fibers do not flow in a controlled fashion towards the collector and do not deposit evenly on the collector, as illustrated schematically in FIG. 1. The process of WO2013096672 used in the present invention remedies this situation by applying air and electrostatic charge to fibrils and fibers being ejected from a rotating member, with the objective of producing a particularly uniform web.

In one embodiment, the rotating member is a spinning disk or a spinning bowl, but is not limited to such and any member that has an edge or an orifice ("discharge point") from which fibers can be discharged. The process may then comprise the steps of supplying a spinning melt or solution of at least one thermoplastic polymer to an inner spinning surface of a heated rotating distribution disc, cup, or other device having a forward surface fiber discharge point. The spinning melt or solution ("spinning fluid") is distributed along the inner spinning surface so as to distribute the spinning melt into a thin film and toward the discharge point. The process may further comprise a discharging step that consists essentially of discharging continuous separate molten polymer fibrous streams from the forward surface discharge point and then such fibrous streams or fibrils are attenuated by centrifugal force to produce polymeric fibers. The discharged fibrous stream may be attenuated by an air flow directed with a component radially away from the discharge point.

It will be understood by one skilled in the art that other means of generating the fibers from a rotating member can be used. For example the rotating member may have holes or orifices through which the polymer melt or solution is discharged. The rotating member can be in the form of a cup, or a flat or angled disk. The fibrils or fibers formed from the rotating member may be attenuated by air, centrifugal force, electrical charge, or a combination thereof.

FIG. 1 schematically illustrates apparatus that can be used to practice an embodiment of the invention. A spin pack comprises a rotating hollow shaft 101 for driving a spin disk 105. A fiber stretching zone air heating ring 103 with a perforate air exit plate is assembled around the spin disk. A shaping air ring 102 is mounted above the stretching zone air ring and passes air vertically downwards in the orientation in order to direct fiber towards the collector 111. A charged ring with needle assembly 104 is placed inside of stretching zone air heating ring 103 in order to charge the fiber stream 110. An air hub 108 is mounted below the spin disk 105 on the rotating shaft 101. A desired fiber stream 110 of umbrella shape carrying electric charge is formed by the air flow field from the combination of the air from the gap of spin disk and its heater, the stretching zone air, the shaping air and the air flow from the rotating air hub.

The fibers were laid on a belt collector to form nanofibrous nonwoven web using the process of WO 2013/096672, which is hereby incorporated by reference. A vacuum box web laydown collector may be placed under the whole spin pack. The spin pack to collector distance may be in a range of 10 cm 15 cm. The collector may have a perforated surface. Vacuum is applied to the collector with the highest vacuum strength at the corners and the edges of the collector and the vacuum strength gradually reduce moving away from the corners and the edges of the collector to the center of the collector where the vacuum strength is zero.

The web structure that can be used to implement the process of the invention and this is obtained with the implementation of FIG. 1. Due to the filming instability, the thin film moves outward with radial banding from the center to the edge, and the film appears wavy in thickness. The nanofibers are formed from the thinner region of thin film, the coarse fibers are from the thick region of the film, and the microfibers are from the film region in between.

Fibers may be spun from any of the thermoplastic resins capable of using in centrifugal fiber or nanofiber spinning. These include polar polymers, such as polyesters, polyethylene terephthalate (PET), polybutylene terephthalate (PBT), and polytrimethyl terephthalate (PTT), and polyamides like nylon, suitable non-polar polymers include polypropylene (PP), polybutylene (PB), polyethylene (PE), poly-4-methylpentene (PMP), and their copolymers (including EVA copolymer), polystyrenepolymethylmethacrylate (PMMA), polytrifluorochloroethylene, polyurethanes, polycarbonates, silicones, and blends of these.

Methods of Charging

Any high voltage direct current (d.c.) or even alternating current (a.c.) source may be used to supply the electrostatic field of the invention. The electric field is used to supply a charge to the spinning fluid. Spinning fluid may be charged while on the rotating member, or as it is discharged in the form of fibrils or fibers, or even after fibers have been formed as a result of attenuation by air or an electrostatic field. The spinning fluid may be charged directly, such as by means of an ion current from a corona discharge produced by a charged entity proximate to the rotating member. One example of such a charged entity would be a ring concentric with the rotating member and located proximate to the molten polymer or polymer solution or to the fibrils or fibers as they are discharged.

The spinning fluid, fibrils or nanofibers may even be charged by induction from a charge held on or near the collector.

The current drawn in the charging process is expected to be small (preferably less than 10 mA). The source should have variable voltage settings (e.g. 0 kV to 80 kV), preferably −5 kV to −15 kV for corona ring and +50 to +70 kV for collection plate, and preferably (−) and (+) polarity settings to permit adjustments in establishing the electrostatic field.

The nanofibers are therefore charged in the process of the invention relative to a collector, such that an electric field is present between the fibers and the collector. The collector may be grounded or charged directly or indirectly via a charged plate or other entity in its vicinity, for example below it relative to the rotating member.

The nanofibers may attain their charge by the application of a charge to the polymer melt, the molten or solution fibrils, the nanofibers, or any combination of these three locations.

The nanofibers may be charged directly, such as by means of a corona discharge and resulting ion current caused by a charged entity proximate to the fibers. One example of such a charged entity would be a ring concentric with the rotating member and located proximate to the molten polymer or polymer solution or to the fibrils or fibers as they are discharged.

In the case of polymer solution as the process medium, the charging to the solution or nanofiber is not a major issue due to the high electrical conductivity of the solvent. However, in the case of the polymer melt or melt-spun threads, the charging is not easy and trivial because of the low electrical conductivity of most polymers either in the solid or molten state. In the present invention, a stretching zone 106 is defined as the zone of the threads formation around the edge of the rotating bowl. 107. The temperature of the stretching zone is the key element for keeping the threads in molten state in order to have the fibril threads stretched into nanofibers by centrifugal force. More importantly, there is a temperature regime for polymer melt and fibril threads to take the charging more effectively. The electrostatic current on the molten PP fibril threads as a function of temperature measured by the method of thermally stimulated currents (TSCs). For PP, the temperature regime for polymer melt and fibril threads to take charging more effectively is around 165° C. to 195° C. The best optimal temperature of the stretching zone is 180° C. With charging agents in non-polar polymers, the process will work better.

Method of Applying Air

The air flow field has two regions in which the direction and rate of air flow are characterized. The first region is a. the point of discharge of fibrils or fibers from the rotating member; the direction of air flow in this first region is essentially perpendicular to the spinning axis of the rotating member. The air flow may be along the radial direction of the rotating member or it may be at an angle to it, the air may be supplied from a plurality of nozzles located proximate to the rotating member or it may be supplied from a slot, or otherwise in a continuous fashion around the edge of the rotating member. The air may be directed radially outwards from the spinning axis, or it may be directed at an angle to the radius at the point where the air leaves any given nozzle.

The air may therefore be supplied from a nozzle that has an opening that is located on a radius of the rotating member, and the air flow may be directed at an angle to the radius of between 0 and 60 degrees and in a direction opposite to the direction of rotation of the rotating member.

The second region is in the space proximate to the collector and at a distance from the periphery of the rotating member. In this region the air flow is essentially perpendicular to the collector surface. The air therefore directs the fibers on to the surface of the collector where they are pinned by the electrostatic charge on the fibers and the electric field between the collector and the rotating member.

Air in this region may be supplied by nozzles located on the underside of the rotating member, on the surface facing the collector. The nozzles may be directed towards the collector.

The air flow field may further comprise a flow of air into the collector that is essentially perpendicular to the collector from a region between the body of the rotating member and the collector surface.

The present invention is directed toward an air filtration media comprising a single layer polymeric electret nanofibrous web comprising a single source randomly intermingled fiber network having an electrostatic charge up to −20 kV, a filtration efficiency range from about 70% to about 99.99%, and an air resistance less than about 2.5 mm wg for 0.3 diameter micron particles.

The nanofibrous web comprises: (a) at least about 65% by number of fibers in the nanofibrous web are nanofibers with a number average diameter less than about 1000 nm; (b) at most about 30% by number of fibers in the nanofibrous web are microfibers with a number average diameter from about 1.0 µm to about 3.0 µm; and (c) at most about 5% by number of fibers in the nanofibrous web are coarse fibers with a number average diameter greater than about 3.0 µm.

The nanofibrous web has a porosity of at least about 70%, a mean flow pore size of at most about 15 µm, and a Frazier air permeability about from 870 cm$^3$/cm$^2$/min to about 6000 cm$^3$/cm$^2$/min at 125 Pa.

The nanofibrous web has a basis weight of between about 5 to about 100 g/m$^2$ or even between about 10 g/m$^2$ to about 60 g/m$^2$.

The nanofibrous web comprises a polymer selected from the group consisting of polypropylene and polypropylene-polypropylene blends wherein the polypropylenes in the blend are different.

The nanofibrous web is made by a centrifugal melt spinning process.

Test Methods

In the non-limiting Examples that follow, the following test methods were employed to determine various reported characteristics and properties. ASTM refers to the American Society of Testing Materials.

Fiber Size Measurement

Fiber Diameter was measured using scanning electron microscopy (SEM). In order to reveal the fiber morphology in different levels of detail, SEM images were taken at nominal magnifications of ×25, ×100, ×250, ×500, ×1,000, ×2,500, ×5,000 and ×10,000. For fiber diameter counting, fibers were counted from at least 5 (up to 10) images at a magnification of 5000× or 2500×.

Fibers were counted from an image with magnification ×500. At least 400 fibers were individually marked and counted. The area of the 500× image is 36467 micron$^2$ while the area of 5 images at ×5000 is 1339 micron$^2$. In order to ensure the same area for counting at both magnifications, the counts taken at ×5000 were multiplied by 36467/1339=27 times. For the individual measurements, a new combined measurement data set was created by replicating the measurements from ×5000 magnification 20 times and concatenating that with the measurements from the ×500 magnification. If this were not done, there would be bias introduced in the data since the counting at ×5000 is more sensitive to smaller fibers and at ×500 the counting is more sensitive to larger fibers. Similarly the area of the ×2500 image is 1475 micron$^2$ so in order to ensure the same area for counting at both magnifications, the counts taken at ×2500 were multiplied 4.8 times. For the individual measurements, a new combined measurement data set was created by replicating the measurements from ×2500 magnification 5 times and concatenating that with the measurements from the ×500 magnification.

Basis Weight was determined by ASTM D-3776 and report in g/m$^2$.

Web Porosity is defined as a ratio of the volumes of the fluid space in a filter divided by the whole volume of the filter, and can be computed from the measured pore volume and bulk density of the material. The porosity of the sample was calculated from the basis weight and the thickness measurement for each sample. In practice, the basis weight (BW) of the sheet is calculated by the weight of a given sample size (W) divided by the sample area (A). The basis weight of the sample sheet was measured by punching out three samples of a fixed area across the transverse direction of the sheet and weighing them using a standard balance.

The volume of this sample size is thus A*δ where δ is the thickness of the sample. The thickness was measured using a Checkline MTG-D thickness gauge at a pressure of 10 kPa and was averaged over three measurements at different points of the sample across the transverse direction. The weight of the sample is the weight of the fibers in the sample volume. If the solid fraction of the sheet is φ and the bulk polymer density is ρ is then $$W = \phi \rho A * \delta$$

Since BW=W/A, Thus φ=BW/ρδ and polymer density ρ

$$\text{Porosity} = 1 - \text{Solid Fraction}$$

$$1 - BW/\rho\delta$$

Frazier Air Permeability is a measure of the amount of time required for a certain volume of air to pass through a test specimen. The air pressure is generated by a gravity loaded cylinder that captures an air volume within a chamber using a liquid seal. This pressurized volume of air is directed to the clamping gasket ring, which holds the test specimen. Air that passes through the specimen escapes to atmosphere through holes in the downstream clamping plate. Frazier air permeability measurements were carried out using either a FAP-5390F3 or an FX3300 instrument, both manufactured by Frazier Precision Instrument Co Inc. (Hagerstown, Md.).

In using the FAP-5390F3 instrument, the test specimen is mounted at the sample stand. The pump is so adjusted that the inclined type air pressure gauge shows the pressure of 12.7 cm at the water column by use of the resistor for pressure adjustment use. From the scale indication observed then of the vertical type air pressure gauge and the kind of used orifice, the air amount passes the test specimen, is obtained. The size of the nozzle was varied depending upon the porosity of the material.

In using the FX3300 instrument, a powerful, muffled vacuum pump draws air through an interchangeable test head with a circular opening. For measurement the test head appropriate for the selected test standard is mounted to the instrument. The specimen is clamped over the test head opening by pressing down the clamping arm which automatically starts the vacuum pump. The preselected test pressure is automatically maintained, and after a few seconds the air permeability of the test specimen is digitally displayed in the pre-selected unit of measure. By pressing down the clamping arm a second time the test specimen is released and the vacuum pump is shut-off. Since the vacuum pump is automatically started when the test specimen is clamped in place over the test head opening, the test pressure builds up only after the test specimen has been clamped. The test pressure is digitally pre-selected in accordance with the test standard. It is automatically controlled and maintained by the instrument. Due to a true differential measurement the test pressure is measured accurately, even at high air flow rates. The air flow through the test specimen is measured with a variable orifice. The air permeability of the test specimen is determined from the pressure drop across this orifice, and is digitally displayed in the selected unit of measure for direct reading. High stability, precision pressure sensors provide for an excellent measuring accuracy and reproducibility of the test results.

In this measurement, a pressure difference of 124.5 N/m$^2$ is applied to a suitably clamped media sample and the resultant air flow rate is measured as Frazier air permeability and is reported in units of cm$^3$/min/cm$^2$. Frazier air permeability was normalized to 34 g/m$^2$ basis weight by multiplying the Frazier air permeability by the basis weight and divided by 34 and is reported in cm$^3$/min/cm$^2$. High Frazier air permeability corresponds to high air flow permeability and low Frazier air permeability corresponds to low air flow permeability.

Flux Barrier is a measure of small particle filtration efficiency without sacrificing air or liquid flow. The property is defined as the Frazier Air Permeability m$^3$/m$^2$ min divided by the mean flow pore size in microns.

Electrostatic Charge (E.S.) was measured using SIMCO FMX-003 Electrostatic Fieldmeter. The FMX-003 measures static voltages within +/−22 kV (22,000V) at a distance of 1".

Mean Flow Pore Size was measured according to ASTM E 1294-89, "Standard Test Method for Pore Size Characteristics of Membrane Filters Using Automated Liquid Porosimeter." Individual samples of different size (8, 20 or 30 mm diameter) were wetted with the low surface tension fluid as described above and placed in a holder, and a differential pressure of air was applied and the fluid removed from the sample. The differential pressure at which wet flow is equal to one-half the dry flow (flow without wetting solvent) is used to calculate the mean flow pore size using supplied software. Mean flow pore size was reported in μm.

Bubble Point was measured according to ASTM F316, "Standard Test Methods for Pore Size Characteristics of Membrane Filters by Bubble Point and Mean Flow Pore Test." Individual samples (8, 20 or 30 mm diameter) were wetted with the low surface tension fluid as described above. After placing the sample in the holder, differential pressure (air) is applied and the fluid was removed from the sample. The bubble point was the first open pore after the compressed air pressure is applied to the sample sheet and is calculated using vendor supplied software. Fine Particle Flat Sheet Loading Test was determined as follows. ASHRAE dust and ISO fine dust are typically used as test aerosol in dust holding capacity test for filters as well as filter media. However, the size of these two types of dust (greater than 15 micron mass average particle diameter) are not reflective of the size of dust which high efficiency air filters are challenged with in field applications, especially when pre-filters are used to remove large particles. Our field measurement in an air handling system with pre-filters indicates that particles larger than 3 microns are rare and between 0.3 to 10 microns size range, about 60% particle by mass falls between 0.3 to 0.5 micron size ranges. Therefore, existing dust holding test using ASHRAE and ISO fine test aerosol does not accurately predict filter media dust holding capacity in real life situation. To overcome this problem, a fine particle dust-loading test was developed which uses test aerosol with a mass mean diameter of 0.26 micron.

Fine particle dust-loading tests were conducted on flat-sheet media using automated filter test (TSI Model No. 8130) with a circular opening of 11.3 cm diameter (area=100 cm$^2$). A 2 wt % sodium chloride aqueous solution was used to generate fine aerosol with a mass mean diameter of 0.26 micron, which was used in the loading test. The air flow rate was 40 liter/min which corresponded to a face velocity of 6.67 cm/s. According to equipment manufacturer, the aerosol concentration was about 16 mg/m$^3$. Filtration efficiency and initial pressure drop are measured at the beginning of the test and the final pressure drop is measured at the end of the test. Pressure drop increase is calculated by subtracting the initial pressure drop from the final pressure drop.

Filtration Efficiency Measurement was conducted on flat-sheet media using automated filter test (TSI Model No. 8130) with a circular opening of 11.3 cm diameter (area=100 cm2). A 2 wt % sodium chloride aqueous solution was used to generate fine aerosol with a mass mean diameter of 0.26 micron. The air flow rate was 40 liter/min which corresponded to a face velocity of 6.67 cm/s. Filtration efficiency and initial pressure drop were measured and recorded at the beginning of the test.

Filtration Efficiency (FE) and Pressure Drop (dP) was measured as follows. A TSI 3160 Filtration Tester (The Model 3160 Automated Filter Tester) was used to measure filter efficiency and penetration versus particle size. Challenging filters and/or filter media with a known particle size is achieved by using atomizers and the Electrostatic Classifier to generate particles. Upstream and downstream particle detection is accomplished using tow Condensation Particle Counters. The measurements were done with 0.3 micron particle @10.5 ft/min.

Efficiency Index (EI) is defined as −log(1−FE/100)

Resistance refers to the resistance (pressure drop) as measured using the test method described in EN 1822 (1998). Air Resistance is measured in units called "water gauge" or "mm WG".

EXAMPLES

Nanofibrous web media consisting of continuous fibers were made in a similar manner to using centrifugal melt spinning process of U.S. Pat. No. 8,277,711. Examples in this invention were made by incorporating changes of operation on temperatures, melt feeding rate and disk rotating speed in order to create the filming instability, the relative thicker film moves outward with radial banding from the center to the edge, and the film appears wavy in thickness. The nanofibers are formed from the thinner region of thin film, the coarse fibers are from the thick region of the film, and the microfibers are from the film region in between. The process of fiber laying into web media was the process of WO 2013/096672.

In the examples, the Air filtration medium were made by a spin disk using an apparatus as illustrated in FIG. 1. The polymer used in Examples is a polypropylene (PP) blend of 40% a high molecular weight (Mw) PP homopolymer Finplas 3825 and 60% a low molecular weight (Mw) PP homopolymer E-M PP3546G. PP3546G is of Mw=28,400 g/mol, melt flow rate=1800 g/10 min (230° C./2.16 kg), and the zero shear viscosity is 4.00 Pa·S at 260° C., from Exxon-Mobile. Finplas 3825 is of Mw=176,000 g/mol, melt flow rate=30 g/10 min (230° C./2.16 kg), and the zero shear viscosity is 186.35 Pa·S at 260° C. from TOTAL Petrochemicals USA.

The comparative examples from commercial materials were used as received unless otherwise indicated.

Example 1

A polypropylene (PP) media consisting of continuous fibers were made using a centrifugal melt spin process U.S. Pat. No. 8,277,711, with a 152.4 mm diameter spin disk. A PRISM extruder with a gear pump was used to deliver the polymer melt to the rotating spin disk through the melt transfer line. The extrusion temperature was set at 240° C. The temperature of the spinning melt from the melt transfer line was set to 300° C. the melt feeding rate was 10 gram/min. The temperature setting point of air heater to spin disk were 290° C. The rotation speed of the spin disk was set to a constant 10,000 rpm. The fibers were laid on a belt collector to form PP web media using the process of WO 2013/096672, which is hereby incorporated by reference. The web laydown of fibers is controlled by a combination of the designed air flow field and a charging arrangement. The operation parameters of air flow field are the air temperatures and air flow rates of the stretching zone air, shaping air and a center air applied through the hollow rotating shaft and an anti-swirling hub. There is dual high voltage charging on the collector belt and an on the corona ring around the spinning disk. The web is laid down at a distance under the spin disk. The spin enclosure temperature is 40° C. and the humidity is 11% with dual high voltage charging of +70 kV and 0.23 mA on collector belt, −11.5 kV and 0.58 mA on the corona ring. The stretching zone air flow was set at 220° C. and 8.0 SCFM. The shaping air flow was set at 80° C. and 12.0 SCFM. The center air flow through the hollow rotating shaft and anti-swirling hub was set at 25° C. and 1.5 SCFM. The nanofiber web was laid down on a belt collector with a laydown distance of 12.7 cm with the belt moving at 152.4 cm/min.

The fiber size was measured from an image using scanning electron microscopy (SEM). The fibers were determined to have a fiber diameter of total fibers of the mean=598 nm and the median=389 nm. There are 83.88% nanofibers of the mean=426 nm and the median=374 nm, 13.89% microfibers of the mean=1.539 μm and the median=1.337 μm, 2.2% coarse fibers of the mean=5.149 μm and the median=5.16 μm.

The electrostatic charge remained on as-spun web was −12.2 kV. Example 1-1, Example 1-2 and Example 1-3 were made after post-process, such as trimming and re-winding of web roll, the electrostatic charge remained on air filtration medium were −9.7 kV, −9.8 kV and −10 kV. The detailed data of media structure and filtration properties are shown in Table 1 and Table 2.

Example 2

Example 2 was made the same PP blend under similar conditions of Example 1 with the following changes. The temperature of the spinning melt from the melt transfer line was set to 300° C. the melt feeding rate was 5 gram/min. The temperature setting point of air heater to spin disk were 290° C. The nanofiber web was laid down on a belt collector with a laydown distance of 12.7 cm with the belt moving at 45.72 cm/min. The spin enclosure temperature is 24° C. and the humidity is 11%, with dual high voltage charging of +70 kV and 0.21 mA on collector belt, −11.7 kV and 0.49 mA on the corona ring. The stretching zone air flow was set at 200° C. and 8.0 SCFM. The shaping air flow was set at 80° C. and 12.0 SCFM. The center air flow through the hollow rotating shaft and anti-swirling hub was set at 25° C. and 1.5 SCFM.

The fiber size was measured from an image using scanning electron microscopy (SEM). The fibers were determined to have the fiber diameter of total fibers of the mean=940 nm and the median=553 nm. There are 74.4% nanofibers of the mean=477 nm and the median=400 nm, 22% microfibers of the mean=1.577 μm and the median=1.50 μm, 3.6% coarse fibers of the mean=6.407 μm and the median=5.05 μm. The electrostatic charge remained on as-spun web was −12.2 kV. Example 2-1, Example 2-2 and Example 2-3 were made after post-process, such as trimming and re-winding of web roll, the electrostatic charge remained on air filtration medium were −0.8 kV, −0.5 kV and −0.4 kV. The detailed data of media structure and filtration properties are shown in Table 1 and Table 2.

Example 3

Example 3 was made the same PP blend under similar conditions of Example 1 with the following changes. The temperature of the spinning melt from the melt transfer line was set to 300° C. the melt feeding rate was 5 gram/min. The temperature setting point of air heater to spin disk were 290° C. The Nanofiber web was laid down on a belt collector with a laydown distance of 12.7 cm with the belt moving at 150 cm/min. The spin enclosure temperature is 44° C. and the humanity is 13%, with dual high voltage charging of +70 kV and 0.21 mA on collector belt, −11.7 kV and 0.49 mA on the corona ring. The stretching zone air flow was set at 200° C. and 8.0 SCFM. The shaping air flow was set at 80° C. and 12.0 SCFM. The center air flow through the hollow rotating shaft and anti-swirling hub was set at 25° C. and 1.5 SCFM.

The fiber size was measured from an image using scanning electron microscopy (SEM). The fibers were determined to have the fiber diameter of total fibers of the mean=510 nm and the median=340 nm. There are 89.31% nanofibers of the mean=350 nm and the median=310 nm, 10.33% microfibers of the mean=1.71 μm and the median=1.65 μm, 0.37% coarse fibers of the mean=5.17 μm and the median=5.09 μm.

The electrostatic charge remained on as-spun web was −15.8 kV. Example 3-1, Example 3-2 and Example 3-3 were made after post-process, such as trimming and re-winding of web roll, the electrostatic charge remained on air filtration medium were −12.8 kV, −11.5 kV and −10.4 kV. The detailed data of media structure and filtration properties are shown in Table 1 and Table 2.

Comparative Example 1

Comparative Example 1 was melt blown polypropylene media made using melt blowing equipment according to the process of U.S. Patent Application 2008/0023888. Three melt blown dies were used Die #1: a micron melt blown die of 100 holes/inch, with the spinning orifices (holes) of 0.12 mm in diameter and the ratio of length to diameter of 60:1.

Die #2: a nano melt blown die of 100 holes/inch, with the spinning orifices (holes) of 0.12 mm in diameter and the ratio of length to diameter of 150:1

Die #3: a micron melt blown die of 200 holes/inch, with the spinning orifices (holes) of 0.06 mm in diameter and the ratio of length to diameter of 30:1

The PP polymer melt temperature is 245° C., pack pressure is 620 psi, air gap is 0.048 cm, air heater was set at 287° C. and the actual blowing air is 223° C. The fiber was deposited on scrim at forming distance of 16.5 cm.

Comparative Example 1-1 was made from Exxon MTS 1500 PP with 0.3 gram/hole/minute. About 25 gsm of PP fibers of average diameter of 1136 nm were collected as a web sample.

Comparative Example 1-2 was made from PP MFR=1800 from Die #3 with 0.66 kilogram/hole/minute. About 4 gsm of PP fibers of average diameter of 320 nm were deposited on a 16 gsm spunbond PP scrim to make the 19.22 gsm web.

Comparative Example 1-3 was made from PP MFR=1500 from Die #3 with 0.71 kilogram/hole/minute. About 25 gsm of PP fibers of average diameter of 320 nm were deposited on an 8 gsm spunbond PP scrim to make the 19.22 gsm web.

Comparative Example 1-4 was made from PP MFR=1800 from Die #2 with 0.83 kilogram/hole/minute. About 1 gsm of PP fibers of average diameter of 320 nm were deposited on a 17 gsm spunbond PP scrim to make the 17.38 gsm web.

There was no electrostatic charge on these samples. Other detailed data of web properties are shown in Table 1 and Table 2.

Comparative Example 2

Comparative Example 2 were solution electroblown nylon media obtained a 24% solution of polyamide-6, 6 in formic acid was spun by electroblowing as described in WO 2003/080905 to form nanowebs. Comparative Example 2-1 has the number average fiber diameters approximately 350 nm. Comparative Example 2-2 has the number average fiber diameters approximately 400 nm. Comparative Example 2-3 has the number average fiber diameters approximately 600 nm.

There was no residual electrostatic charge on the samples. Other detailed data of web properties are shown in Table 2.

Comparative Examples 3 and 4

Comparative Example 3 and 4 were melt blown polypropylene media obtained from commercial filters Max. Allergen from 3M. Comparative Example 3 was discharged. Comparative Example 4 was used as received.

Comparative Example 5

Comparative Example 5 was a charged melt blown nanofiber air filter media.

The single layer electret nanofibrous web can be made by a nozzle-less centrifugal melt spinning process of U.S. Pat. No. 8,277,711 with modified operation conditions as described above and the resulting nanofibers can be laid on a belt collector to form web media using the process of WO 2013/096672. The single layer nanofibrous web comprising intermingled fiber networks of the majority of nanofibers, the small percentage of microfibers and some of coarse fibers can be made through the single process as a single source. The resulting nanofibrous web has a number average fiber diameter of total fibers about and less than 1000 nm. There are at least 65% nanofibers with the mean and median diameter less than 500 nm. There are at most 30% microfibers and the rest are coarse fibers. The optimized electrostatic charging used in helping fiber laydown into nonwoven web makes the resulting web an eletrets. The electrostatics in the web is about at least −8.0 kV, and it was remained at least −3.0 kV in the web even after roll-to-roll post-processes in 8 months after spinning, such as, trimming, rewinding and calendering.

The single layer polymeric electret nonwoven fibrous webs in the present invention have been tested as air filtration media.

Figure 3:
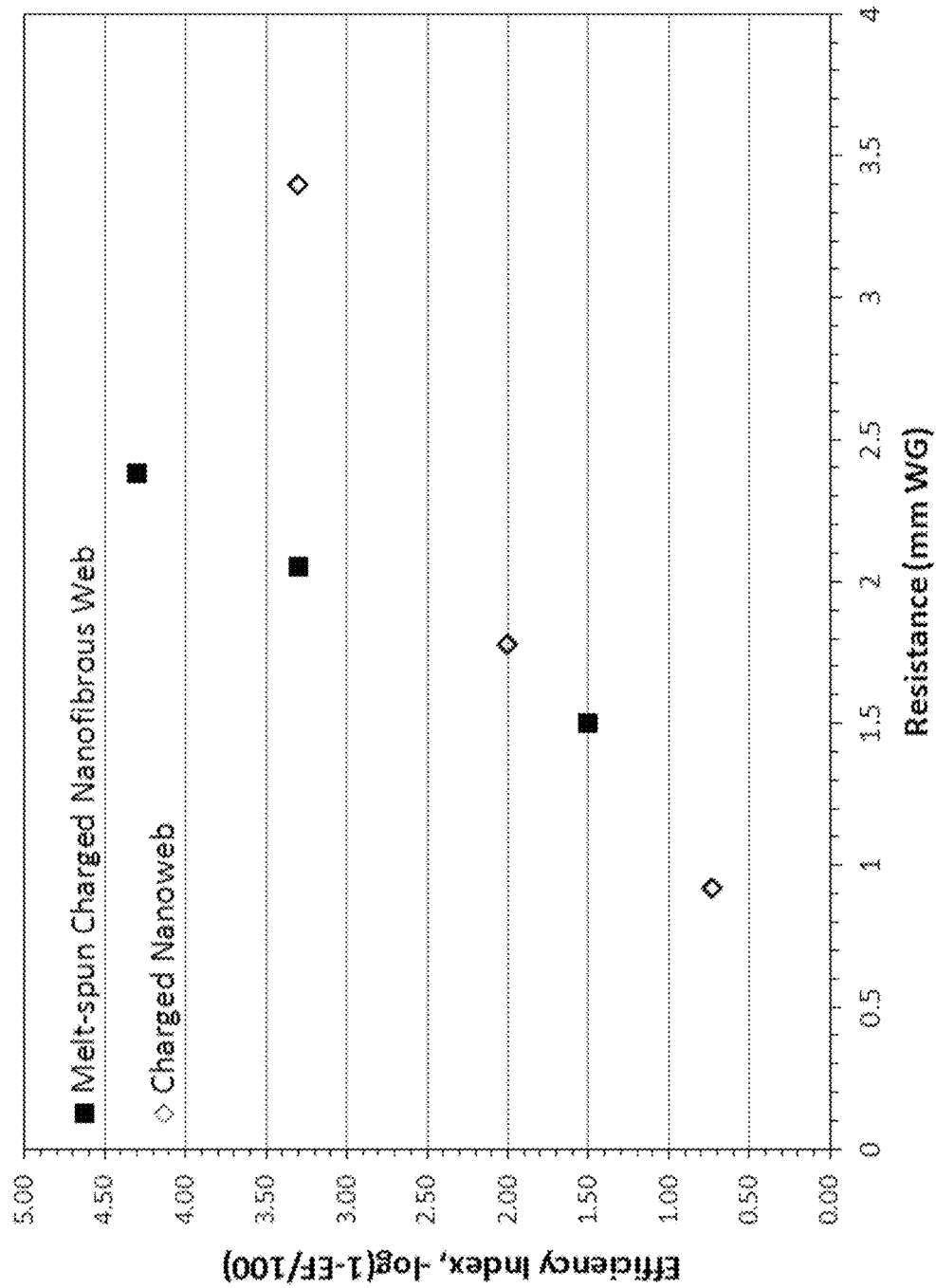
FIG. 3 is the efficiency index of air filtration media as a function of air resistance for Examples of the present invention as compared with melt spun nonwovens of the Comparative Examples.

Examples in the present invention have better filtration effeciency and lower resistance than the uncharged Comparative Examples made from electroblown web, melt blown nanofiber web and melt blown microfiber nonwoven web. FIG. 3 shows the Examples with higher charge and smaller fiber diameter in the present invention have better filtration effeciency and lower resistance than the uncharged Comparative Examples made from charged melt blown nanofiber webs.

TABLE 1

| Media ID | Fiber Diameter, Mean (μm) | MFP (μm) | BP (μm) | Nanofiber BW (gsm) | Scrim BW (gsm) | Thickness (μm) | Frazier (cm$^3$/min/cm$^2$) | Porosity (%) | E.S. Charge (kV) |
|---|---|---|---|---|---|---|---|---|---|
| Example 1-1 | 598 | 17.33 | 40.39 | 18.00 | 0.00 | 270 | 4084.32 | 93.0 | −9.7 |
| Example 1-2 | 598 | 16.13 | 39.62 | 18.00 | 0.00 | 270 | 4084.32 | 93.0 | −9.8 |
| Example 1-3 | 598 | 15.08 | 39.05 | 18.00 | 0.00 | 270 | 4084.32 | 93.0 | −10 |
| Example 2-1 | 940 | 13.28 | 45.43 | 45.00 | 0.00 | 170 | 5913.12 | 73.5 | −0.8 |
| Example 2-2 | 940 | 14.17 | 47.67 | 45.00 | 0.00 | 170 | 5913.12 | 73.5 | −0.5 |
| Example 2-3 | 940 | 14.27 | 44.80 | 45.00 | 0.00 | 170 | 5913.12 | 73.5 | −0.4 |
| Example 3-1 | 510 | 7.58 | 28.19 | 20.00 | 0.00 | 157.48 | 871.73 | 86.63 | −12.8 |
| Example 3-2 | 510 | 6.57 | 22.91 | 20.00 | 0.00 | 157.48 | 871.73 | 86.63 | −11.5 |
| Example 3-3 | 510 | 5.81 | 21.35 | 20.00 | 0.00 | 157.48 | 871.73 | 86.63 | −10.4 |
| Comparative Example 1-1 | 1136 | 8.30 | 17.10 | 2.00 | 19.22 | 194.8 | 1045.46 | 89.1 | No |
| Comparative Example 1-2 | 320 | 5.20 | 15.20 | 4.00 | 18.44 | 148.2 | 2456.69 | 84.8 | No |
| Comparative Example 1-3 | 596 | 6.50 | 15.00 | 26.96 | 0.00 | 190 | 792.48 | 85.8 | No |
| Comparative Example 1-4 | 489 | 19.50 | 52.30 | 1.00 | 17.38 | 150.4 | 4035.55 | 87.78 | No |

TABLE 2

Media Properties

| Media ID | Media Type | EF (%) at 0.3 Microns | EI (Efficiency index) | Resistance (mm WG) |
|---|---|---|---|---|
| Example 1-1 | Melt-Spun Nanofibrous Web | 80.64 | 0.71 | 1.08 |
| Example 1-2 | Melt-Spun Nanofibrous Web | 86.44 | 0.87 | 1.33 |
| Example 1-3 | Melt-Spun Nanofibrous Web | 88.42 | 0.94 | 1.50 |
| Example 2-1 | Melt-Spun Nanofibrous Web | 81.72 | 0.65 | 1.17 |
| Example 2-2 | Melt-Spun Nanofibrous Web | 77.36 | 0.54 | 1.15 |
| Example 2-3 | Melt-Spun Nanofibrous Web | 69.94 | 0.52 | 1.03 |
| Example 3-1 | Melt-Spun Nanofibrous Web | 99.995 | 4.3 | 2.38 |
| Example 3-2 | Melt-Spun Nanofibrous Web | 99.95 | 3.3 | 2.05 |
| Example 3-3 | Melt-Spun Nanofibrous Web | 99 | 1.5 | 1.50 |
| Comparative Example 1-1 | Melt-Blown Nanofibers | 56.60 | 0.36 | 3.70 |
| Comparative Example 1-2 | Melt-Blown Nanofibers | 46.10 | 0.27 | 1.60 |
| Comparative Example1-3 | Melt-Blown Nanofibers | 72.30 | 0.56 | 4.40 |
| Comparative Example 1-4 | Melt-Blown Nanofibers | 32.40 | 0.17 | 1.00 |
| Comparative Example 2-1 | E-Blown Nanofibers | 67.19 | 0.48 | 3.56 |
| Comparative Example 2-2 | E-Blown Nanofibers | 54.94 | 0.35 | 2.42 |
| Comparative Example 2-3 | E-Blown Nanofibers | 74.44 | 0.59 | 4.31 |
| Comparative Example 3-1 | Melt-Blown Nonwoven | 19.90 | 0.10 | 0.12 |
| Comparative Example 3-2 | Melt-Blown Nonwoven | 19.80 | 0.10 | 0.15 |
| Comparative Example 3-3 | Melt-Blown Nonwoven | 30.60 | 0.16 | 0.65 |
| Comparative Example 3-4 | Melt-Blown Nonwoven | 27.30 | 0.14 | 0.55 |
| Comparative Example 4-1 | Melt-Blown Nonwoven | 66.00 | 0.57 | 0.13 |
| Comparative Example 4-2 | Melt-Blown Nonwoven | 73.00 | 0.47 | 0.47 |
| Comparative Example 4-3 | Melt-Blown Nonwoven | 81.00 | 0.64 | 0.64 |
| Comparative Example 5-1 | Charged Nanoweb | 81.5 | 0.73 | 0.92 |
| Comparative Example 5-2 | Charged Nanoweb | 99 | 2.00 | 1.78 |
| Comparative Example 5-3 | Charged Nanoweb | 99.95 | 3.4 | 3.30 |

What is claimed is:

1. An air filtration media comprising a single layer polymeric electret nanofibrous web comprising a single source randomly intermingled fiber network having an electrostatic charge, the electrostatic charge being up to −20 kV, the nanofibrous web further having a filtration efficiency range from 70% to 99.99%, and an air resistance less than 2.5 mm wg for 0.3 diameter micron particles;
wherein the nanofibrous web comprises nanofibers, microfibers, and coarse fibers: and
wherein the nanofibrous web comprises:
   (a) at least 65% by number of fibers in the nanofibrous web are nanofibers with a number average diameter less than 1000 nm;
   (b) at most 30% by number of fibers in the nanofibrous web are microfibers with a number average diameter from 1.0 µm to 3.0 µm; and
   (c) at most 5% by number of fibers in the nanofibrous web are coarse fibers with a number average diameter greater than 3.0 µm.

2. The air filtration media of claim 1, wherein the nanofibrous web has a porosity of at least 70%, a mean flow pore size of at most 15 µm, and a Frazier air permeability from 870 cm$^3$/cm$^2$/min to 6000 cm$^3$/cm$^2$/min at 125 Pa.

3. The air filtration media of claim 1, wherein the nanofibrous web has a basis weight of 5 to 100g/m$^2$.

4. The air filtration media of claim 1, wherein the nanofibrous web has a basis weight of 10 g/m$^2$ to 60 g/m$^2$.

5. The air filtration media of claim 4, wherein the nanofibrous web has a basis weight of 10 g/m$^2$ to 20 g/m$^2$.

6. The air filtration media of claim 1, wherein the nanofibrous web comprises a polymer that is a polypropylene or polypropylene blend.

7. The air filtration media of claim 1, wherein the nanofibrous web is made by a centrifugal melt spinning process.

\* \* \* \* \*